United States Patent [19]
Chisholm

[11] 3,912,799
[45] Oct. 14, 1975

[54] CENTRIFUGAL EXTRUSION EMPLOYING EDDY CURRENTS
[75] Inventor: Douglas S. Chisholm, Midland, Mich.
[73] Assignee: The Dow Chemical Company, Midland, Mich.
[22] Filed: Oct. 15, 1973
[21] Appl. No.: 406,510

[52] U.S. Cl. .............. 264/25; 264/176 C; 425/381.2
[51] Int. Cl.² ......................................... H05B 9/00
[58] Field of Search ......... 264/25, 176 C; 425/381.2

[56] References Cited
UNITED STATES PATENTS
3,483,281 12/1969 Chisholm .............................. 264/25

*Primary Examiner*—Lester L. Lee
*Attorney, Agent, or Firm*—Robert B. Ingraham

[57] ABSTRACT

A centrifugal extrusion die is prepared using a non-ferromagnetic electrically conductive portion and a second ferromagnetic electrically conductive portion. The die is induction heated by applying the magnetic field to a region adjacent the non-magnetic portion. The requirement for either heavy thrust bearings or a balanced magnetic field is eliminated.

10 Claims, 1 Drawing Figure

U.S. Patent  Oct. 14, 1975  3,912,799
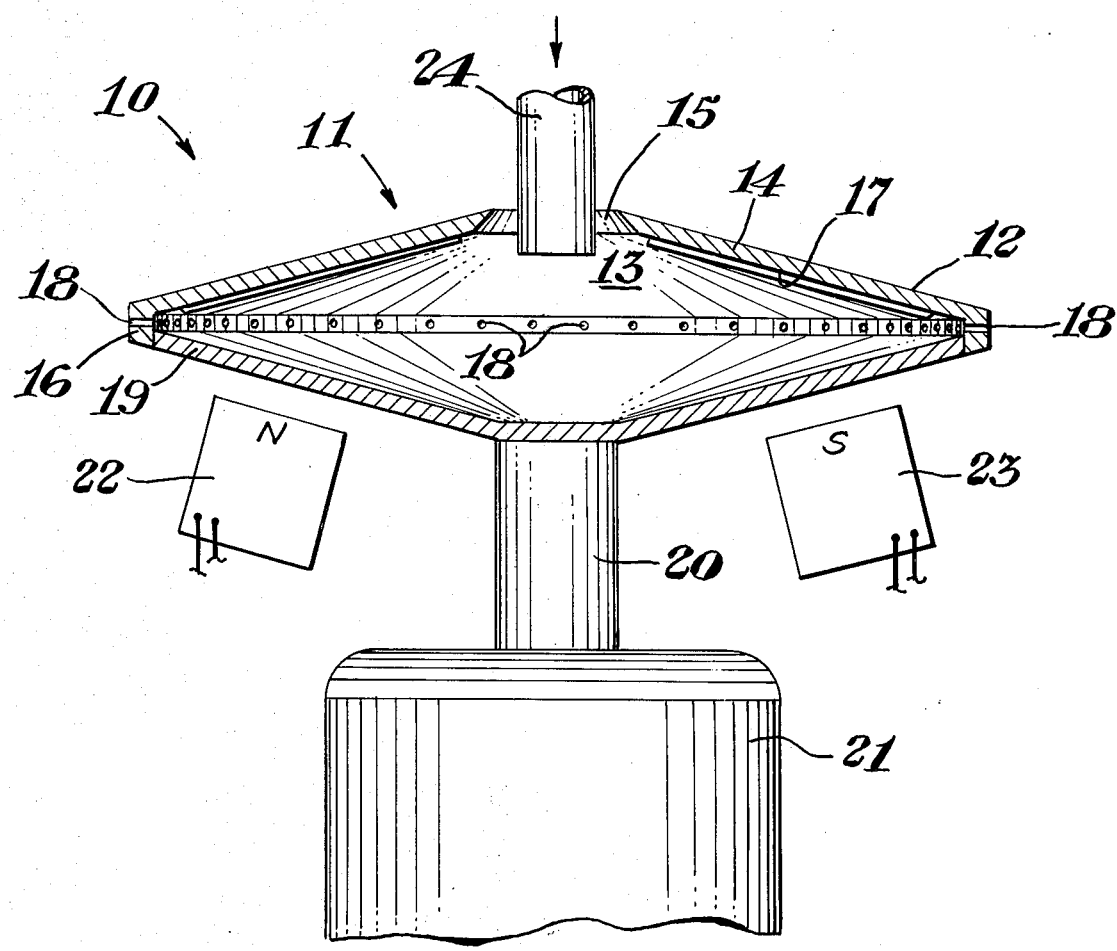

CENTRIFUGAL EXTRUSION EMPLOYING EDDY CURRENTS

Centrifugal extrusion of a variety of materials is well known wherein extrudable material is placed within a spinning die having peripheral extrusion openings and the resultant centrifugal force is employed to force the extrudable material through the peripheral openings. Centrifugal extrusion is shown in my earlier U.S. Pat. Nos. 3,409,712; 3,424,832; 3,483,281 and 3,697,211, the teachings of which are herewith incorporated by reference thereto. One particularly desirable form of centrifugal extrusion employs induction heating to heat the spinning or rotating die and permit the extrusion of the material to occur while providing a minimal heat history to the extrude. Induction heating in centrifugal extrusion is shown in U.S. Pat. Nos. 3,409,712 and 3,483,281. In order to simplify construction of a centrifugal extruder it is often very desirable to mount the extrusion die directly on the motor shaft. For convenience in operating as well as disassembly and cleaning of the die, it is desirable to have at least one side of the die conveniently exposed. In earlier designs of centrifugal extruders using induction heating, a balanced magnetic field (that is, electromagnets on either side of the die) were employed in order to avoid excessive thrust on the motor bearings.

It would be desirable if there were available an improved apparatus for centrifugal extrusion employing eddy current heating.

It would also be desirable if there were available an improved method for eddy current heating of centrifugal extrusion dies.

It would further be desirable if simplified construction of eddy current-heated centrifugal extruders were available.

These benefits and other advantages in accordance with the present invention are achieved in a method for the centrifugal extrusion of extrudable material comprising rotating an electrically thermally conductive extrusion die having a plurality of peripherally disposed discharge openings defined therein, the openings being in communication with a generally centrally disposed material receiving cavity, applying to the die a magnetic field, rotating the die and inducing electric current within the die sufficient to cause flow of the material from the discharge openings due to centrifugal force, supplying material to the cavity and heating material in the die and subsequently discharging material from the discharge openings, the improvement which comprises providing a die of at least two generally discoidal parts, the first discoidal part being of a ferromagnetic material, the second part being of an electrically conductive non-ferromagnetic material and applying the electromagnetic field adjacent the second side of non-ferromagnetic material.

Also contemplated within the scope of the present invention is an improved centrifugal extrusion apparatus comprising a rotor, the rotor defining an internal material receiving cavity, a peripheral edge and a plurality of passageways extending generally radially outward from an axis of rotation of the rotor and in connection with the material receiving cavity, the rotor comprising at least two generally discoidal portions which, in cooperative combination, define the material receiving cavity, the improvement which comprises one of the rotor portions being of the ferromagnetic material and the remaining rotor portion being of a non-ferromagnetic material.

Further features and advantages of the present invention will become more apparent from the following specification taken in connection with the drawing wherein the FIGURE shows a schematically cutaway representation of an apparatus in accordance with the present invention generally designated by the reference numeral 10.

The apparatus 10 comprises a rotor 11. The rotor 11 has a hollow housing 12 of a generally discoidal configuration. The rotor 11 defines therein a cavity 13. The cavity 13 also has a generally discoidal configuration. The housing 12 comprises a first housing or rotor portion 14. The housing portion 14 defines an inlet opening 15 generally symmetrically disposed about the axis of generation of the portion 14. Remote from the opening 14 is disposed a flange 16 extending generally in an axial direction. A layer 17 is optionally disposed adjacent the cavity 13. The layer 17 has a high electrical conductivity and is beneficially of copper, nickel or the like. The flange 16 has defined therein a plurality of extrusion passages 18. The passages 18 provide communication between the cavity 13 and space external to the rotor 11. A second housing or rotor portion 19 is disposed in generally parallel relationship to the housing portion 14. The rotor portion 19 is also of generally discoidal configuration and is affixed to the flange 16 of the first portion 14. The portion 19 is affixed to an end of the shaft 20. The shaft 20 in turn is rotated by a motor 21. Thus, the rotor 11 has generally rotational symmetry about a projection of the axis of the shaft 20. The portion 14 of the rotor 11 is of a ferromagnetic electrically conductive material, while the portion 19 is of a non-ferromagnetic electroconductive material. First electromagnets 22 and 23 are disposed immediately adjacent the rotor portion 19 and remote from the rotor portion 19 the magnets 22 and 23 are connected to an appropriate variable power supply, not shown, and carried by suitable supports, not shown, and polarity of the magnets indicated N and S. The material control of the supply means 24 is disposed generally adjacent the material inlet 15 and adapted to supply material to the cavity 13 of the rotor 11.

In operation of the apparatus 10 of the present invention, the rotor or die 11 is rotated by means of the motor, a magnetic field applied to the rotor by means of the electromagnets 22 and 23, each activated by means of alternating or direct current. However, direct current is generally found to be more suitable and provide excellent temperature control. When the die or rotor 11 has reached or approaches desired operating temperature, the material is supplied from the supply means 24 and rapidly extruded from the orifice 18. Because of the non-magnetic material employed for the rotor portion 19 disposed adjacent the electromagnets, little or no thrust is generated in an axial direction toward the motor 21. As the ferromagnetic material of the housing portion 14 is disposed remotely from the magnets the force exerted by the magnets is minimal and the problem of excessive end thrust is avoided. The apparatus using magnets disposed on the drive or motor side of the rotor permits free access to the opposite side for disassembly and cleaning. The rotor portions 14 and 19 may be held together by any desirable means, such as by bolts or the thermally induced interference fit described in U.S. Pat. No. 3,697,211. Centrifugal extruders such as depicted in the Figure are eminently satisfactory for the extrusion of synthetic thermoplastic resins, low melting metals, asphalts and the like.

A wide variety of materials may be employed to fabricate extruders in accordance with the present invention. For many applications generally the nonmagnetic electrically conductive element is prepared from any metal having a low relative magnetic permeability. By "low relative magnetic permeability" is meant a relative magnetic permeability of 3 or less, and beneficially a relative magnetic permeability of less than about 1.1. For many extruder applications such non-magnetic materials include titanium and austenitic stainless steels of the 300 series such as 302 stainless, 303 stainless and 304 stainless. The magnetic component of the extruder beneficially is ferromagnetic and may include a surface layer, such as the layer 17 of FIG. 1, of copper, nickel or brass on the side adjacent the electromagnets for improved heating efficiency generally in the manner of that described in U.S. Pat. No. 2,181,274, the teachings of which are herewith incorporated by reference thereto. Suitable magnetic materials include carbon steels and advantageously the ferromagnetic stainless steels of the ferritic or martensitic varieties of stainless steel including 403, 405, 410, 416, 420, 501 and 502 stainless steels. The stainless steel designations are those of the American Iron and Steel Institute. Desirably, such magnetic materials have a relative magnetic permeability in excess of 100, and beneficially between about 350 and 500. Employing the foregoing principles, suitable materials are readily selected for any desired thermoplastic material which is to be extruded, the selection being based on the magnetic permeabilities and chemical resistance to the extruded material under extrusion conditions.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. In a method for the centrifugal extrusion of extrudable material comprising rotating an electrically and thermally conductive extrusion die having a plurality of peripherally disposed discharge openings defined therein, the openings being in communication with a generally centrally disposed material receiving cavity, applying to the die a magnetic field, rotating the die and inducing electric current within the die sufficient to cause flow of the material from the discharge openings due to centrifugal force, supplying material to the cavity and heating the material in the die and subsequently discharging the material from the discharge openings, the improvement which comprises providing a die of at least two generally discoidal parts, the first discoidal part being of a ferromagnetic material, the second part being of an electrically conductive generally non-ferromagnetic material, and applying the electromagnetic field adjacent the second side of generally non-ferromagnetic material.

2. The method of claim 1 wherein the first discoidal part is a ferromagnetic stainless steel.

3. The method of claim 1 wherein the second part is titanium.

4. The method of claim 1 wherein the electromagnetic field is a direct current field.

5. The method of claim 1 where the first part is a ferromagnetic stainless steel and the second part is of titanium.

6. An improved centrifugal extrusion apparatus comprising a rotor, the rotor defining an internal material receiving cavity, a peripheral edge and a plurality of passageways extending generally radially outward from an axis of rotation of the rotor and in connection with the material receiving cavity, the rotor comprising at least two generally discoidal portions which, in cooperative combination, define the material receiving cavity, the improvement which comprises one of the rotor portions being of the ferromagnetic material and the remaining rotor portion being of a nonferromagnetic material.

7. The extrusion apparatus of claim 6 wherein the first discoidal part is a ferromagnetic stainless steel.

8. The extrusion apparatus of claim 6 wherein the second part is titanium.

9. The extrusion apparatus of claim 6 wherein the electromagnetic field is a direct current field.

10. The extrusion apparatus of claim 6 where the first part is a ferromagnetic stainless steel and the second part is of titanium.

* * * * *